United States Patent
Muramatsu

(10) Patent No.: US 7,375,758 B2
(45) Date of Patent: May 20, 2008

(54) ELECTRONIC CAMERA

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 661 days.

(21) Appl. No.: 10/761,227

(22) Filed: Jan. 22, 2004

(65) Prior Publication Data

US 2004/0207736 A1    Oct. 21, 2004

(30) Foreign Application Priority Data

Jan. 24, 2003   (JP)   ............................. 2003-015763

(51) Int. Cl.
*H04N 5/238* (2006.01)
*H04N 5/202* (2006.01)

(52) U.S. Cl. ..................... 348/364; 348/254

(58) Field of Classification Search ........ 348/362–366, 348/229.1, 230.1, 254, 256, 671, 674
See application file for complete search history.

(56) References Cited

U.S. PATENT DOCUMENTS

| | | | | |
|---|---|---|---|---|
| 4,969,045 | A * | 11/1990 | Haruki et al. | 348/229.1 |
| 5,079,622 | A * | 1/1992 | Toshinobu | 348/229.1 |
| 6,570,620 | B1 * | 5/2003 | Yoshimura et al. | 348/362 |
| 6,583,820 | B1 * | 6/2003 | Hung | 348/362 |
| 6,831,696 | B1 * | 12/2004 | Saeki | 348/362 |
| 6,940,556 | B1 * | 9/2005 | Tamune | 348/350 |
| 6,950,141 | B2 * | 9/2005 | Mori et al. | 348/362 |
| 6,989,867 | B2 * | 1/2006 | Kim | 348/362 |
| 2002/0012065 | A1 * | 1/2002 | Watanabe | 348/364 |

FOREIGN PATENT DOCUMENTS

JP           A 10-322592        12/1998

* cited by examiner

*Primary Examiner*—Lin Ye
*Assistant Examiner*—Justin P Misleh
(74) *Attorney, Agent, or Firm*—Oliff & Berridge, PLC

(57) ABSTRACT

An electronic camera includes an image-capturing element that captures a subject image and outputs image-capturing signals each corresponding to a pixel; and a control device that executes gradation correction on the image-capturing signals output by the image-capturing element. In the electronic camera, the image-capturing element is split into a plurality of pixel areas each containing a plurality of pixels; and the control device calculates average values of image-capturing signal values in the pixel areas, which are output by the image-capturing element prior to a shutter release, determines an exposure quantity and gradation characteristics based upon the average values having been calculated each in correspondence to one of the plurality of pixel areas, engages the image-capturing element to capture an image at the exposure quantity having been determined in response to the shutter release and executes gradation correction on image-capturing signals output by the image-capturing element in conformance to the gradation characteristics having been determined.

7 Claims, 4 Drawing Sheets

ELECTRONIC CAMERA

INCORPORATION BY REFERENCE

The disclosure of the following priority application is herein incorporated by reference:
Japanese Patent Application No. 2003-15763 filed Jan. 24, 2003

BACKGROUND OF THE INVENTION

1. Field of the Invention

The present invention relates to an electronic camera that obtains electronic image data by capturing a subject image with an image-capturing device constituted with a CCD image sensor or the like.

2. Description of the Related Art

There are electronic cameras known in the related art that determine the exposure quantity to be achieved during a photographing operation based upon the difference between the largest value and the smallest value indicated by image-capturing signals output from an image-capturing device and executes the photographing operation at the exposure quantity thus determined (see, for instance, Japanese Laid Open Patent Publication No. H 10-322592). In the electronic camera disclosed in Japanese Laid Open Patent Publication No. H 10-322592, a histogram is prepared by using image-capturing signals each corresponding to a pixel which are obtained during a photographing operation and a gradation characteristics curve to be used for gradation correction (γ control) is determined based upon the histogram. By determining the gradation characteristics in this manner, the saturation of image-capturing signals in a high brightness range is suppressed and thus, the occurrence of so-called white flare is minimized.

The electronic camera disclosed in Japanese Laid Open Patent Publication No. H 10-322592 requires a considerable length of time for the histogram preparation processing and also it is not suitable for photographing scenes containing numerous point light sources such as night time city scenes. Namely, since the image-capturing signals each corresponding to a pixel, which indicate the point light sources, are targeted for the saturation suppression, the brightness levels of the point light sources are lowered and the photographed image fails to show the full beauty of the nocturnal scene as a result.

SUMMARY OF THE INVENTION

According to the 1st aspect of the invention, an electronic camera comprises: an image-capturing element that captures a subject image and outputs image-capturing signals each corresponding to a pixel; and a control device that executes gradation correction on the image-capturing signals output by the image-capturing element, and: the image-capturing element is split into a plurality of pixel areas each containing a plurality of pixels; and the control device calculates average values of image-capturing signal values in the pixel areas, which are output by the image-capturing element prior to a shutter release, determines an exposure quantity and gradation characteristics based upon the average values having been calculated each in correspondence to one of the plurality of pixel areas, engages the image-capturing element to capture an image at the exposure quantity having been determined in response to the shutter release and executes gradation correction on image-capturing signals output by the image-capturing element in conformance to the gradation characteristics having been determined.

According to the 2nd aspect of the invention, in the electronic camera according to the 1st aspect, it is preferred that the control device determines the exposure quantity and the gradation characteristics based upon a number of average values exceeding a first deciding threshold value among the calculated average values corresponding to the plurality of pixel areas.

According to the 3rd aspect of the invention, in the electronic camera according to the 1st aspect, it is preferred that when a number of average values exceeding a first deciding threshold among the calculated average values corresponding to the plurality of pixel areas is smaller than a predetermined value, the control device sets the exposure quantity to a first exposure quantity and sets the gradation characteristics to first gradation characteristics, and when the number of average values exceeding the first deciding threshold value among the calculated average values corresponding to the plurality of pixel areas is equal to or greater than the predetermined value, the control device sets the exposure quantity to a second exposure quantity smaller than the first exposure quantity and sets the gradation characteristics to second gradation characteristics whereby a post-gradation correction signal level is raised relative to a signal level achieved through gradation correction effected in conformance to the first gradation characteristics.

According to the 4th aspect of the invention, in the electronic camera according to the 1st aspect, it is preferred that the control device detects a subject brightness value based upon the image-capturing signals output by the image-capturing element prior to the shutter release and determines the exposure quantity based upon the detected subject brightness value.

According to the 5th aspect of the invention, in the electronic camera according to the 3rd aspect, it is preferred that when a largest value among the calculated average values corresponding to the plurality of pixel areas is equal to or smaller than a second deciding threshold value smaller than the first deciding threshold value, the control device sets the exposure quantity to a third exposure quantity larger than the first exposure quantity and sets the gradation characteristics to third gradation characteristics whereby the post-gradation correction signal level is lowered relative to the signal level achieved through the gradation correction effected in conformance to the first gradation characteristics.

According to the 6th aspect of the invention, in the electronic camera according to the 3rd aspect or the fifth aspect, it is preferred that the control device calculates the exposure quantity to be achieved in response to the shutter release based upon a subject brightness value, detects the subject brightness value based upon the image-capturing signals output by the image-capturing element prior to the shutter release and corrects the detected subject brightness value so as to achieve either the first exposure quantity or the second exposure quantity having been determined.

DESCRIPTION OF THE PREFERRED EMBODIMENTS

The following is an explanation of the embodiments of the present invention, given in reference to the drawings.

Figure 1:
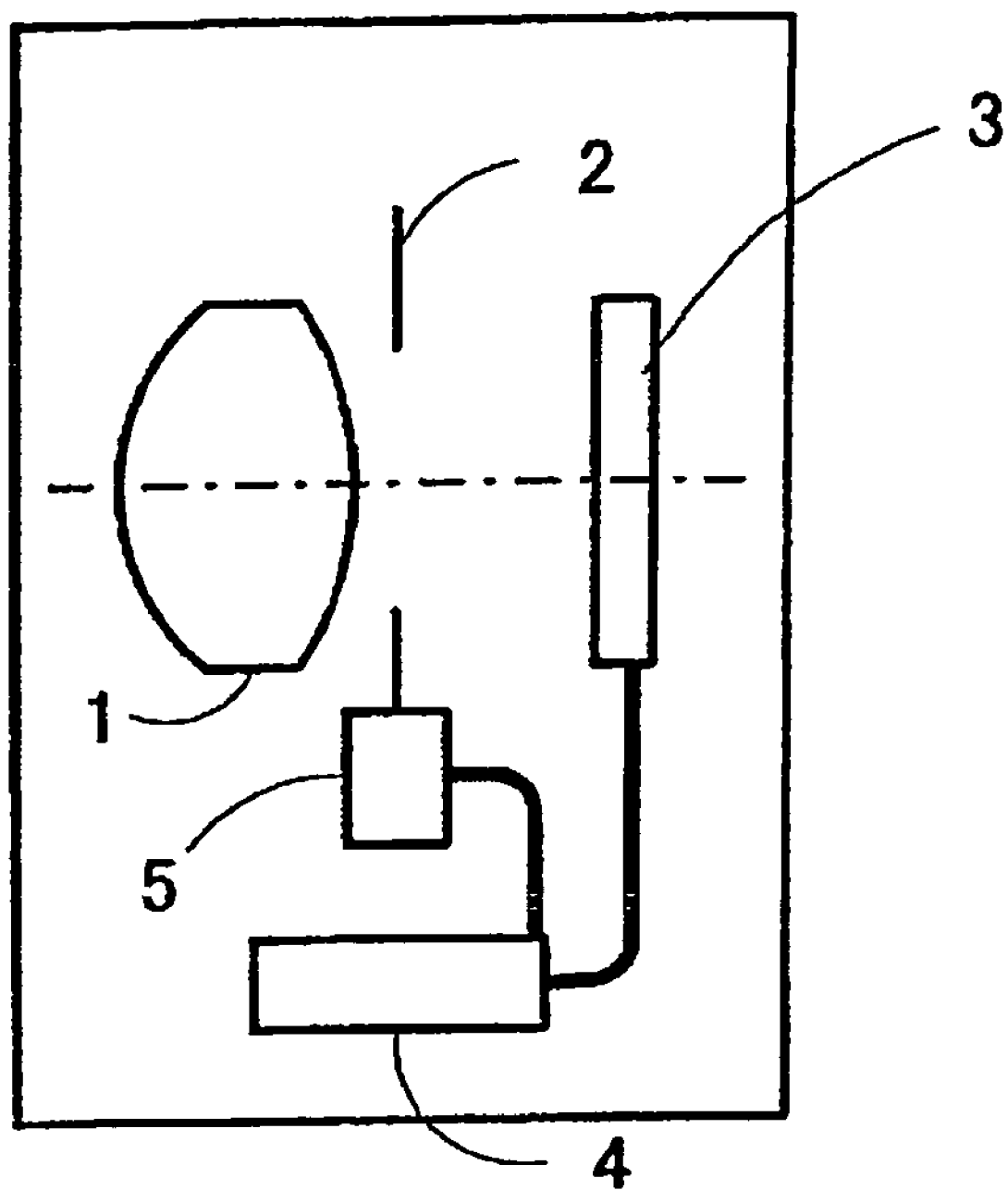
FIG. 1 is a schematic block diagram of the electronic camera achieved in an embodiment of the present invention.

FIG. 1 is a schematic block diagram of the electronic camera achieved in an embodiment of the present invention. The electronic camera in FIG. 1 includes a photographic lens 1, an aperture mechanism 2, an image-capturing device 3 constituted with a CCD image sensor or the like, an image processor constituted with a CPU and the like and an aperture drive mechanism 5. On the image-capturing surface of the image-capturing device 3, a subject image is formed with subject light having passed through the photographic lens 1 and the aperture mechanism 2.

The image-capturing device 3 repeatedly captures the subject image in a steady manner while the power to the electronic camera is in an ON state. The image-capturing device 3 stores signal charges each corresponding to a pixel in conformance to the brightness of the subject image during an image-capturing operation. The stored charges are sequentially cleared from the image-capturing device 3 in response to a drive signal provided to the image-capturing device 3 from a drive circuit (not shown). The signal charges first undergo a specific type of analog processing at an analog signal processing circuit (not shown), then are converted to digital image-capturing signals at an A/D conversion circuit (not shown) and are guided to the image processor 4.

The image processor 4 issues an instruction to execute an exposure calculation, an instruction for the aperture drive mechanism 5 to drive the aperture mechanism 2, an instruction for the image-capturing device 3 indicating a specific image-capturing period (a specific charge storage period). In addition, the image processor 4 executes white balance adjustment processing and outline compensation processing on the digital image-capturing signals and also executes image processing such as gradation correction (γ control) processing to be detailed later. The image data resulting from the image processing are recorded into a memory (not shown). The image processor 4 is structured so that it issues an instruction for the image-capturing device 3 to start storing the photographic charges by starting a photographing sequence in response to a shutter release operation signal input from a shutter release switch (not shown).

The aperture drive mechanism 5 drives the aperture mechanism 2 in response to the instruction issued from the image processor 4. It also detects an aperture value (aperture position) at the aperture mechanism 2 and outputs the detection information to the image processor 4.

The present invention is characterized by the operation executed in the electronic camera described above to determine the length of image-capturing time (exposure quantity) to elapse during a photographing operation and determine the gradation conversion characteristics for the gradation correction processing.

Figure 2:
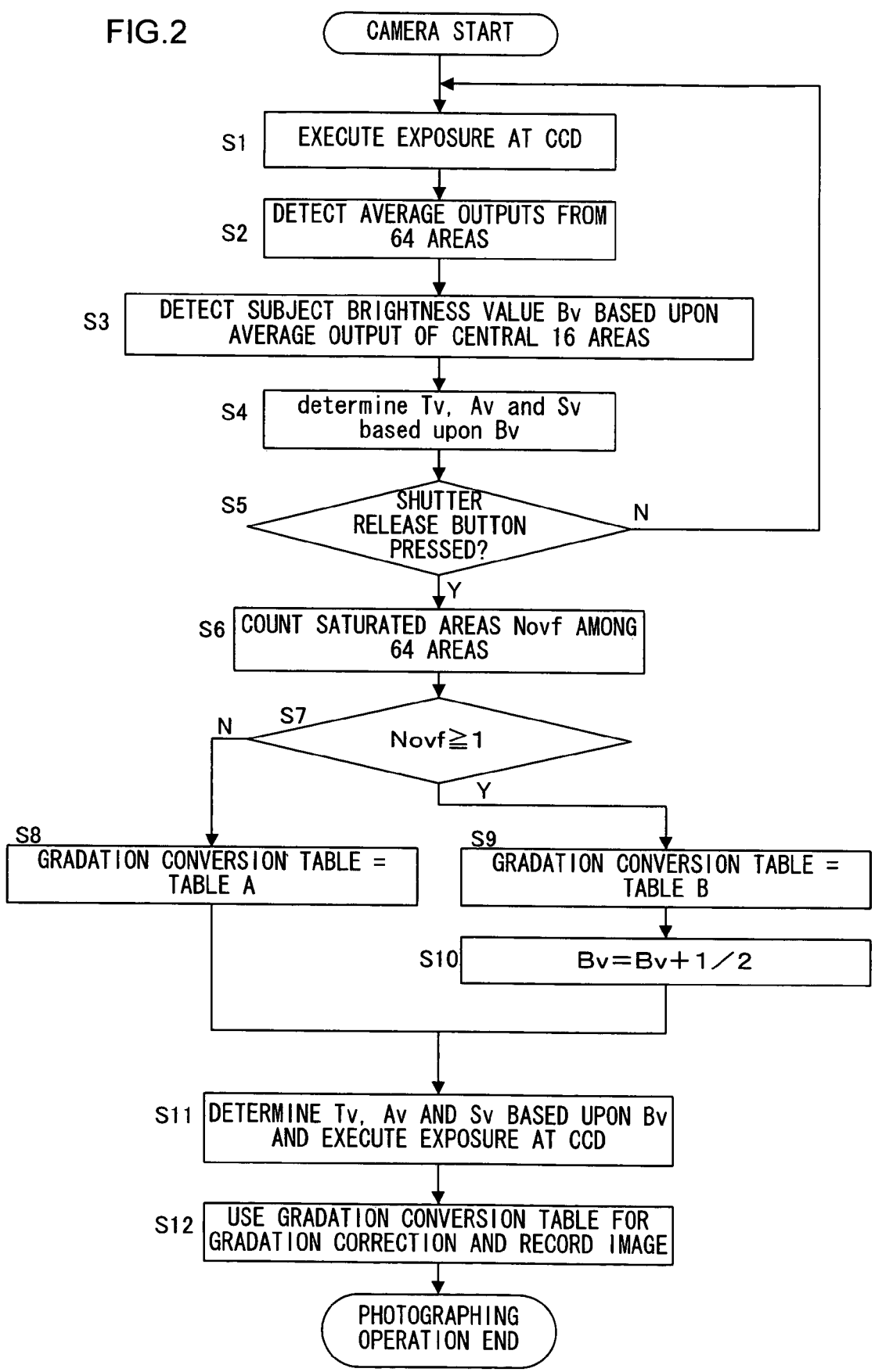
FIG. 2 presents a flowchart of the photograph processing executed by the image processor.

FIG. 2 presents a flow chart of the photograph processing executed at the image processor 4 in the electronic camera. The processing shown in FIG. 2 is repeatedly executed while the power to the electronic camera is in an ON state. In step S1, the image processor 4 issues an instruction for the image-capturing device 3 (CCD images sensor) to execute exposure, and then the operation proceeds to step S2. The exposure operation is executed at this time at an initial value of an exposure quantity set in advance at the image processor 4. At the initial value, which corresponds to a shutter speed Tv, an aperture value Av and a sensitivity value Sv set by assuming that the subject brightness value Bv is +7 (apex value), the image-capturing signals do not saturate as long as the actual subject brightness is at a normal level.

Figure 3:
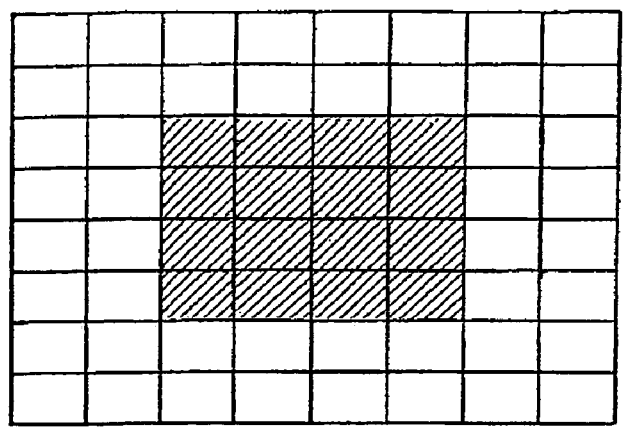
FIG. 3 shows areas achieved by splitting the image-capturing surface of the image-capturing device.

Instep S2, the image processor 4 detects average outputs of 64 areas before the operation proceeds to step S3. FIG. 3 shows a total of 64 areas achieved by splitting the image-capturing surface of the image-capturing device 3 into 8×8 areas along the vertical and horizontal directions. The image processor 4 divides the image-capturing signals each corresponding to a pixel at the image-capturing device 3 into image-capturing signal groups each corresponding to one of the 64 areas, and calculates the average of the values indicated by the image-capturing signals in the each group.

In step S3, the image processor 4 detects the average of the values indicated by the image-capturing signals corresponding to 16 areas set at the center among the 64 areas. The central 16 areas are shaded in FIG. 3. In addition, the image processor 4 executes an arithmetic operation to detect the subject brightness value Bv based upon the average value among the image-capturing signals in the 16 areas, the current shutter speed setting Tv and the current aperture value setting Av and the current sensitivity value setting Sv, and then the operation proceeds to step S4. The shutter speed Tv, the aperture value Av and the sensitivity value Sv set at this point correspond to the initial value mentioned earlier.

In step S4, the image processor 4 executes an exposure calculation based upon the subject brightness value Bv detected in step S3. In this embodiment, a program autoexposure calculation, for instance, is executed. In the program autoexposure calculation, a shutter speed Tv, an aperture value Av and a sensitivity value Sv corresponding to the subject brightness value Bv are determined by using a program chart stored in advance in the image processor 4. Once the image processor 4 executes the exposure calculation, the operation proceeds to step S5.

In step S5, the image processor 4 makes a decision as to whether or not the shutter release button has been pressed. If a shutter release operation signal has been input through the shutter release switch (not shown), the image processor 4 makes an affirmative decision in step S5 to proceed to step S6, whereas if no shutter release operation signal has been input, the image processor 4 makes a negative decision in step S5 to return to step S1.

In step S6, the image processor 4 counts the number of areas among the 64 areas with the average values of the image-capturing signals within the groups exceeding a level equivalent to the saturation level, i.e., the number of saturated areas novf, and then the operation proceeds to step S7. The level equivalent to the saturation level in this context refers to an image-capturing signal level indicating a stored charge quantity at the image-capturing device 3, which is within a predetermined range relative to an upper limit.

In step S7, the image processor 4 makes a decision as to whether or not saturated area number novf $\geq 1$. The image processor 4 makes an affirmative decision in step S7 if the number of saturated areas novf is determined to be equal to or larger than 1 to proceeds to step S9 whereas it makes a negative decision in step S7 if the number of saturated areas novf is 0 to proceed to step S8.

Figure 4:
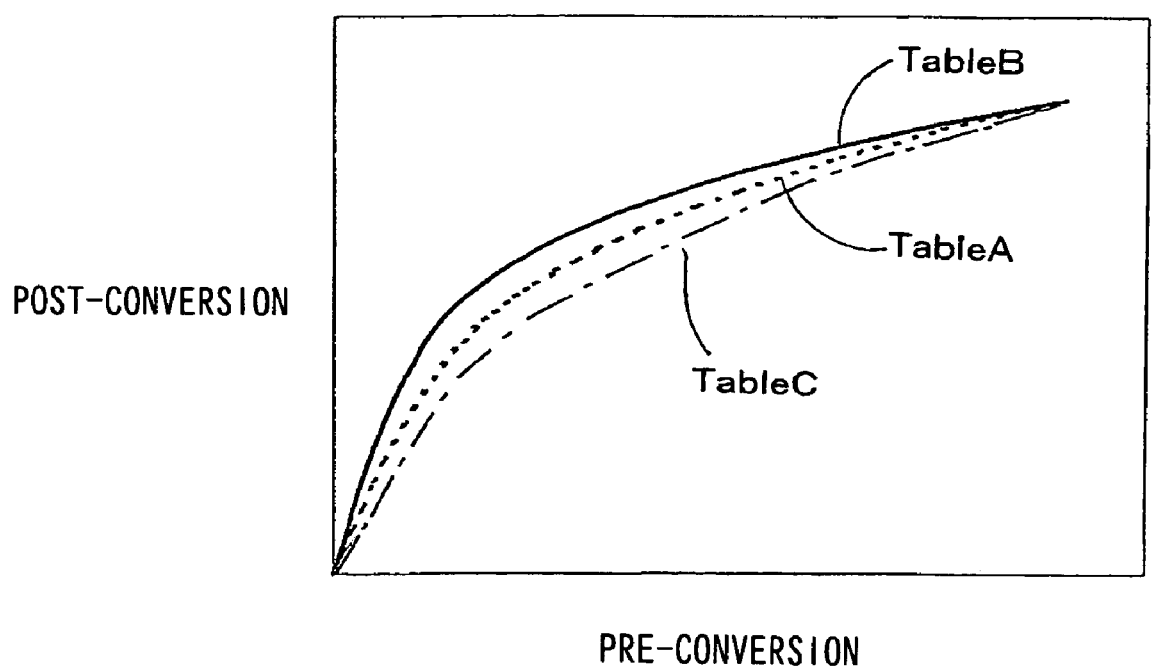
FIG. 4 illustrates examples of gradation conversion tables used in the gradation correction.

In step S8, the image processor 4 selects a gradation conversion table corresponding to a situation in which there is no saturated area, before the operation proceeds to step S11. FIG. 4 presents examples of gradation conversion tables that maybe used to correct the gradation. The pregradation conversion signal value is indicated along the horizontal axis and the post-gradation conversion signal value is indicated along the vertical axis. Table A in FIG. 4 is the gradation conversion table used when there is no saturated area. Table B is a gradation conversion table used when there is a saturated area. When Table B is used, the post-gradation conversion signal value becomes larger than the post-gradation conversion signal value that is normally used with Table A, except in the range over which the image-capturing signal level is at its lowest (noise level) and in the range over which the image-capturing signal level is at its highest (equivalent to the saturation level). Table C is to be described in detail later.

In step S9, the image processor 4 selects gradation conversion Table B corresponding to a situation in which there is at least one saturated area, before the operation proceeds to step S10. In step S10, the image processor 4 sets a correction value for the subject brightness value Bv (apex value) to +½ before the operation proceeds to step S11.

In step S11, the image processor 4 executes an exposure calculation for the photographing operation by using the corrected subject brightness value Bv. As in step S4, the image processor 4 determines a shutter speed Tv, an aperture value Av and a sensitivity value Sv corresponding to the subject brightness value Bv by using a program diagram prepared in advance. In addition, the image processor 4 provides a signal indicating the shutter speed Tv having been determined to the drive circuit (not shown) mentioned earlier, a signal indicating the aperture value Av having been determined to the aperture drive mechanism 5 and a signal indicating the sensitivity value Sv having been determined to the image-capturing device 3, thereby starting the photographing sequence. In response, the image-capturing device 3 starts exposure (charge storage).

In step S12, the image processor 4 executes the image processing on image-capturing signals output from the image-capturing device 3 after starting the photographing sequence. The selected gradation conversion table is used for the gradation correction. Once the image processor 4 records the image data resulting from the image processing into the memory (not shown), the sequence of photograph processing shown in FIG. 2 ends.

A further explanation is given on a situation in which there is at least one saturated area. When gradation conversion Table B is selected, the post-gradation correction (post-conversion) signal value becomes higher if the photographing operation is executed at the same exposure quantity compared to the signal value obtained with gradation conversion Table A. Since the subject brightness value Bv is raised by +½ stage in step S10, the control exposure quantity obtained through the exposure calculation (step S11) is reduced by +½ stage relative to the proper exposure quantity. While the signal level of the image-capturing signal obtained through an image-capturing operation executed by lowering the exposure quantity by ½ stage relative to the proper exposure is lower than the signal level achieved through the proper exposure, the signal level can be corrected to achieve signal level equivalent to that obtained through the proper exposure by using gradation conversion Table B, through which signal values are corrected to higher values. At this time, since the degree of gradation correction in the range over which the image-capturing signal level is at the lowest (at the noise level) and in the range over which the image-capturing signal levels is at its highest (equivalent to the saturation level) is substantially equal to the degree of gradation correction effected by using gradation conversion Table A, it is possible to lower the signal levels specifically over the range in which the subject brightness value Bv is high compared to the signal level achieved through the proper exposure.

The following advantages are achieved in the embodiment explained above.

(1) The image processor 4 divides the image-capturing signals each corresponding to a pixel, which are output from the image-capturing device 3 prior to a shutter release into groups each corresponding to one of the 64 areas obtained by splitting the image-capturing surface at the image-capturing device 3 and calculates the average value among the image-capturing signals contained in each group. Then, it counts the number of areas (saturated area number novf) with the calculated average values exceeding a level equivalent to the saturation level, and if the count value is equal to or greater than 1, the image processor 4 selects gradation conversion Table B (step S9) and corrects the subject brightness value Bv by +½ stage (step S10) so as to reduce the photographing exposure quantity by ½ stage (step S10). Since the average of the values indicated by the image-capturing signals in each area is calculated, an area in which image-capturing signals corresponding to a small number of pixels indicate levels equivalent to the saturation level, as in a photographing operation executed to photograph a nocturnal scene with point light sources, is not counted as a saturated area. As a result, even if there are point light sources present in the scene to be photographed, no exposure correction is executed and thus, the beauty of the nocturnal scene is not lost from the photographed image.

(2) In addition to the advantage described above in (1), an area is counted as a saturated area once a majority of the image-capturing signals within the area indicate a level equivalent to the saturation level. Consequently, the exposure correction is effected so as to reduce the photographing exposure quantity by ½ stage to minimize the occurrence of white flare which tends to manifest readily when photographing a highly bright subject. In addition, gradation conversion Table B is selected when reducing the exposure quantity by ½ stage and thus, the gradation correction is effected so as to raise the post-gradation conversion signal values corresponding to image-capturing signals with intermediate values (signal levels that are neither in the noise level range or in the saturation level equivalent range). As a result, the signal levels corresponding to the intermediate values are not lowered even when the exposure quantity is reduced by ½ stage, thereby preventing the photographed image from becoming dark.

(3) Since processing for detecting the brightness distribution state does not need to be executed by, for instance, preparing a histogram with image-capturing signals each corresponding to a pixel output from the image-capturing device 3, the length of processing time before shutter release can be reduced. This advantage ensures that the photographer does not miss a good photo opportunity and it is also effective in a continuous shooting operation.

(4) Since the image processor 4 executes the photographing exposure calculation based upon the corrected subject brightness value Bv (step S11), the exposure calculation is executed by using the latest information.

While an explanation as given above on an example in which the image-capturing signals are divided into 64 groups in correspondence to the 64 areas obtained by splitting the image-capturing surface at the image-capturing device 3 (step S2), the image-capturing surface may be split into 32 areas or 128 areas instead of 64 areas.

While the average among the central 16 areas is calculated to detect the subject brightness value Bv (step S3), the average value among all areas (64 areas in the example described above) may be calculated or the average in a given area or over a plurality of arbitrary areas may be calculated instead.

While the electronic camera executes the program autoexposure calculation (step S4 and step S11) in the example explained above, it may instead execute an aperture value priority autoexposure calculation or a shutter speed priority autoexposure calculation.

While a decision is made instep S7 in FIG. 3 as to whether or not the number of saturated areas novf is equal to or greater than 1, a deciding threshold value does not need to be 1and any appropriate value such as 3 or 10 maybe set for the threshold value instead.

Second Embodiment

In addition to executing the processing described in reference to the first embodiment, a decision is made as to whether or not the contrast of the image is low if the number of saturated areas novf is determined to be 0 and if it is determined that the contrast is low, a gradation conversion table other than Table A or Table B explained earlier is selected and the exposure quantity for the photographing operation is corrected in the second embodiment.

Figure 5:
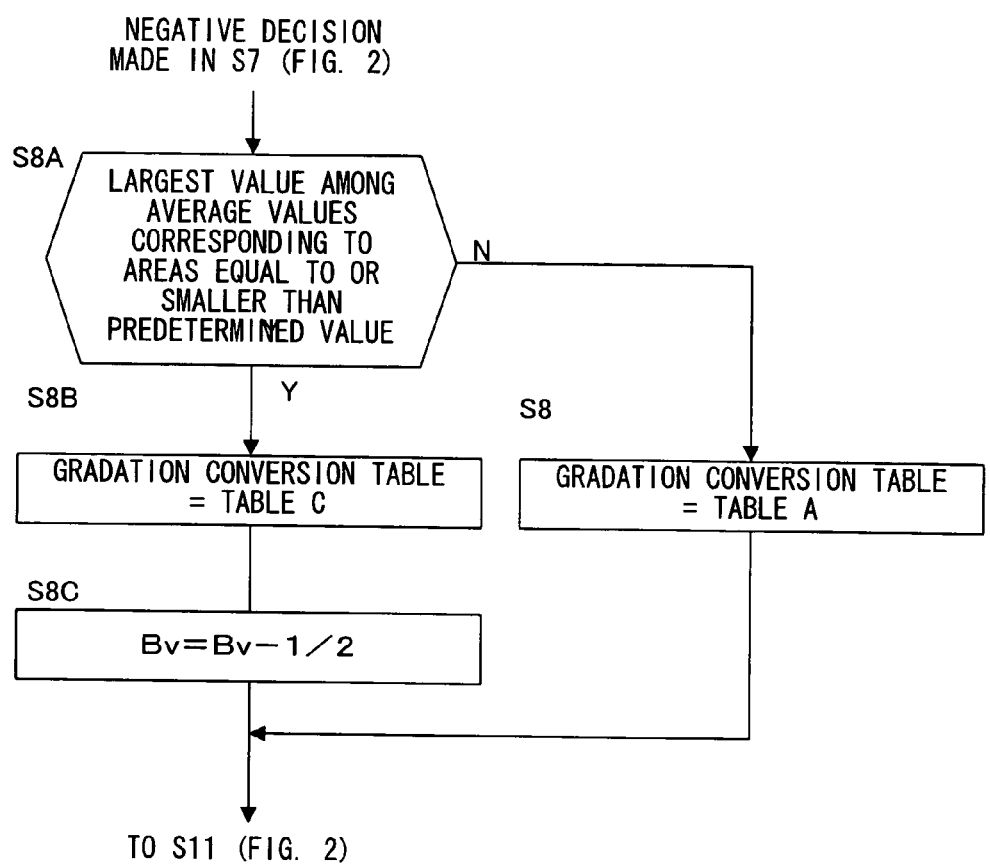
FIG. 5 presents a flowchart of the processing executed in the electronic camera achieved in a second embodiment.

FIG. 5 presents a flowchart of the processing executed by of the image processor 4 in the electronic camera in the second embodiment. The processing in FIG. 5 is executed in place of step S8 in FIG. 2. In step S8A in FIG. 5, to which the operation proceeds after making a negative decision in step S7 in FIG. 2, the image processor 4 makes a decision as to whether or not the largest value among the average values of the values indicated by the image-capturing signals in the individual groups corresponding to the 64 areas is equal to or smaller than a predetermined value. The predetermined value used in the step indicates an image-capturing signal level at which there is no risk of white flare and it satisfies a relationship expressed as: (noise level) < predetermined value < (level equivalent to saturation level).

If the largest value among the image-capturing signal average values is equal to or smaller than the predetermined value, the image processor 4 makes an affirmative decision in step S8A to proceed to step S8B, whereas if the largest value among the image-capturing signal average values exceeds the predetermined value, it makes a negative decision in step S8A to proceed to step S8. Since the processing executed in step S8 is identical to that executed in step S8 in FIG. 2, an explanation for it is omitted.

In step S8B, the image processor 4 selects a gradation conversion table C to be used in a situation in which the largest value among the image-capturing signal average values is equal to or smaller than the predetermined value, and once the gradation conversion table C is selected, the operation proceeds to step S8C. When the table C in FIG. 4 is used, the post-gradation conversion signal value is corrected to a lower value compared to the signal value obtained by using Table A under normal circumstances, over the intermediate range excluding the range over which the image-capturing signal level is at its lowest (noise level) and the range over which the image-capturing signal level is at its highest (equivalent to the saturation level). In step S8C, the image processor 4 sets a correction value for the subject brightness value Bv (apex value) to −½ before the operation proceeds to step S11 in FIG. 2.

In the second embodiment explained above, if the image-capturing signal average values corresponding to the individual areas all indicate a signal level at which there is no risk of white flare (if an affirmative decision is made in step S8A), the exposure is corrected so as to increase the exposure quantity for the photographing operation by ½ stage. When an affirmative decision is made in step S8A, the contrast between a bright area in the image (the area in which the largest image-capturing signal average is achieved) and a dark area can be assumed to be low. Since the image-capturing signal levels are raised so as to prevent white flare under such circumstances, the S/N ratio of the photographic image can be improved. In addition, the gradation conversion table C is selected to increase the exposure quantity by ½ stage, the gradation correction is effected so as to lower the post-gradation conversion signal values of the image-capturing signal level intermediate values. As a result, even when the exposure quantity is increased by ½ stage, the signal levels corresponding to the intermediate values are not raised to an excessive degree and thus, the photographed image does not become too bright. Such a correction is particularly effective when the contrast of the image is low, e.g., the contrast of an image photographed at dusk or indoors.

In the electronic camera described above, the subject brightness value Bv is detected by using image-capturing signals corresponding to the individual areas at the image-capturing device 3. Instead, a special area sensor may be provided exclusively to detect the subject brightness value Bv in addition to the image-capturing device 3 and, in such cases, the subject brightness value Bv can be detected by using the detection values obtained in correspondence to the individual areas at the area sensor.

It is to be noted that the present invention may be described by using the following alternative terms. The level equivalent to the saturation level may instead be referred to as, for instance, a first deciding threshold value. The exposure quantity determined through the exposure calculation executed by using the subject brightness value Bv detected in step S3 may be referred to as, for instance, a first exposure quantity. The gradation characteristics conforming to gradation conversion Table A may be referred to as, for instance, first gradation characteristics.

The exposure quantity determined through the exposure calculation executed by using the corrected subject brightness value Bv in step S10 may be referred to as, for instance, a second exposure quantity. The gradation characteristics conforming to gradation conversion Table B may be referred to as second gradation characteristics. The predetermined value achieving the relationship expressed as; (noise level) < predetermined value < (level equivalent to saturation level) may be referred to as a second deciding threshold value. The exposure quantity determined through the exposure calculation executed by using the corrected subject brightness value Bv in step S8C maybe referred to as, for instance, a third exposure quantity. The gradation characteristics conforming to the gradation conversion table C may be referred to as third gradation characteristics.

The electronic camera in the embodiments having the image-capturing element split into a plurality of pixel areas calculates the average values of the values indicated by the image-capturing signals corresponding to the individual pixel areas, which are output from the image-capturing element prior to a shutter release, and determines an exposure quantity and gradation characteristics based upon the average values corresponding to the plurality of pixel areas. As a result, a desirable exposure quantity and desirable gradation characteristics can be determined when, for instance, photographing a nocturnal scene through a smaller processing load compared to the load of processing executed to prepare a histogram.

The above described embodiments are examples, and various modifications can be made without departing from the spirit and scope of the invention.

What is claimed is:

1. An electronic camera comprising:
an image-capturing element that captures a subject image and outputs image-capturing signals each corresponding to a pixel; and
a control device that executes gradation correction on the image-capturing signals output by the image-capturing element, wherein:
the image-capturing element is split into a plurality of pixel areas each containing a plurality of pixels; and
the control device calculates average values of image-capturing signal values in the pixel areas, which are output by the image-capturing element prior to a shutter release, determines an exposure quantity based upon the average values having been calculated each in correspondence to one of the plurality of pixel areas, determines gradation characteristics based upon a comparison of the average values having been calculated each in correspondence to one of the plurality of pixel areas with a predetermined threshold level, engages the image-capturing element to capture an image at the exposure quantity having been determined in response to the shutter release and executes gradation correction on image-capturing signals output by the image-capturing element in conformance to the gradation characteristics having been determined.

2. An electronic camera according to claim 1, wherein:
the control device determines the exposure quantity and the gradation characteristics based upon a number of average values exceeding a first deciding threshold value among the calculated average values corresponding to the plurality of pixel areas.

3. An electronic camera according to claim 1, wherein:
when a number of average values exceeding a first deciding threshold among the calculated average values corresponding to the plurality of pixel areas is smaller than a predetermined value, the control device sets the exposure quantity to a first exposure quantity and sets the gradation characteristics to first gradation characteristics, and when the number of average values exceeding the first deciding threshold value among the calculated average values corresponding to the plurality of pixel areas is equal to or greater than the predetermined value, the control device sets the exposure quantity to a second exposure quantity smaller than the first exposure quantity and sets the gradation characteristics to second gradation characteristics whereby a post-gradation correction signal level is raised relative to a signal level achieved through gradation correction effected in conformance to the first gradation characteristics.

4. An electronic camera according to claim 3, wherein:
when a largest value among the calculated average values corresponding to the plurality of pixel areas is equal to or smaller than a second deciding threshold value smaller than the first deciding threshold value, the control device sets the exposure quantity to a third exposure quantity larger than the first exposure quantity and sets the gradation characteristics to third gradation characteristics whereby the post-gradation correction signal level is lowered relative to the signal level achieved through the gradation correction effected in conformance to the first gradation characteristics.

5. An electronic camera according to claim 4, wherein:
the control device calculates the exposure quantity to be achieved in response to the shutter release based upon a subject brightness value, detects the subject brightness value based upon the image-capturing signals output by the image-capturing element prior to the shutter release and corrects the detected subject brightness value so as to achieve either the first exposure quantity, the second exposure quantity or the third exposure quantity having been determined.

6. An electronic camera according to claim 3, wherein:
the control device calculates the exposure quantity to be achieved in response to the shutter release based upon a subject brightness value, detects the subject brightness value based upon the image-capturing signals output by the image-capturing element prior to the shutter release and corrects the detected subject brightness value so as to achieve either the first exposure quantity or the second exposure quantity having been determined.

7. An electronic camera according to claim 1, wherein:
the control device detects a subject brightness value based upon the image-capturing signals output by the image-capturing element prior to the shutter release and determines the exposure quantity based upon the detected subject brightness value.

* * * * *